Oct. 10, 1950     R. J. HESS     2,525,747
PACKING
Filed July 11, 1947
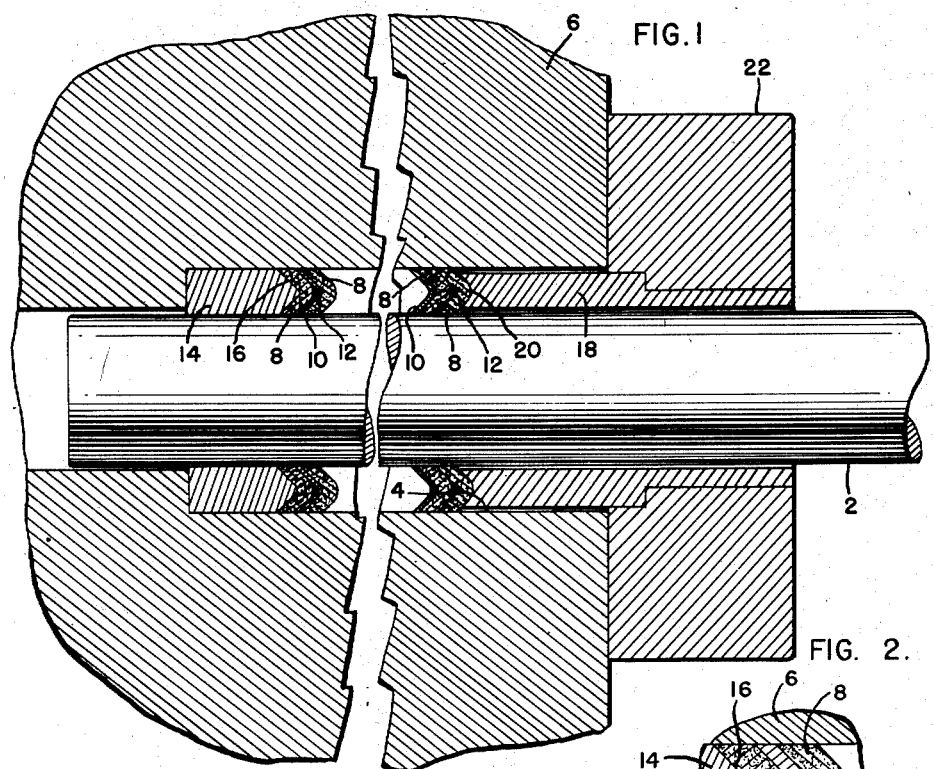
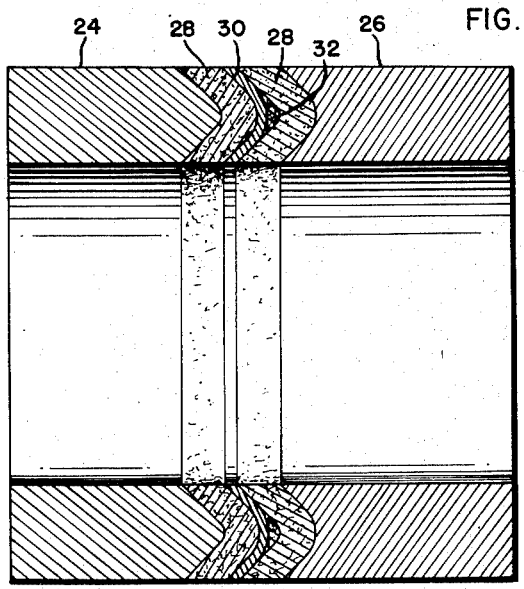
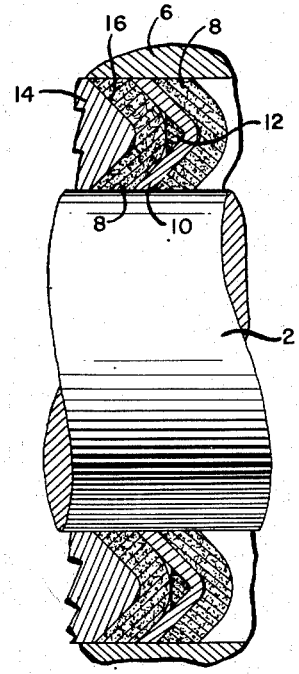
INVENTOR
RELZA J. HESS
BY
ATTORNEY Patented Oct. 10, 1950

2,525,747

UNITED STATES PATENT OFFICE 2,525,747

PACKING

Relza J. Hess, Los Angeles, Calif., assignor to American Steel Foundries, Chicago, Ill., a corporation of New Jersey Application July 11, 1947, Serial No. 760,285

1 Claim. (Cl. 288—5)

This invention relates to high pressure packings of the type wherein a stack of alternately arranged, metallic and non-metallic rings approximately of V-shape in radial cross section are compressed axially to afford a seal around a reciprocal shaft within an opening containing fluid under high pressure. As the stack is compressed, the radially inner perimeters of the rings are spread radially inwardly against the shaft and the outer perimeter of the rings are spread radially outwardly against the margin of the opening thereby affording a seal around the shaft capable of retaining extremely high fluid pressure.

In packings of this type, there is a tendency for the rings to be drawn away from either the inner or outer perimeter of the packing under conditions where, due to commercial tolerances, slight spaces exist between the rings at the apexes of the V-sections thereof. Under these conditions, as the stack of rings is compressed, portions thereof are urged into the spaces thereby distorting the rings and accommodating leakage of pressure fluid through the packing. For this reason, repeated failures have occurred in this type of packing, as is well known to those skilled in the art.

It will be understood that the production of perfectly fitting rings to insure proper functioning of such packings is prohibitive from a cost standpoint and it is, therefore, a primary object of the present invention to design an economical packing of the above-discussed type wherein the parts may be constructed according to ordinary commercial tolerances and wherein spaces are eliminated between the apexes of the V-section rings thereby avoiding leakage of the packing.

This object is accomplished by the insertion of an annulus between one side of each metallic ring and the adjacent non-metallic ring, said annulus preferably being generally triangular in radial cross section with an apex of the triangle complemental to and snugly fitted into one of the abutting rings and a base of the triangle bearing against the external surface of the apex of the other abutting ring. The annulus is preferably formed of non-metallic flexible material so as to conform to the configuration of the abutting rings as the packing is compressed.

The foregoing and other objects and advantages of the invention will become apparent from a consideration of the following specification and the accompanying drawings, wherein:

Figure 1 is a central axial cross sectional view through a packing embodying the invention, the associated shaft being shown in elevation;

Figure 2 is a fragmentary enlarged view of the structure shown in Figure 1; and

Figure 3 is a central axial cross section through another embodiment of the invention.

Describing the invention in detail and referring first to the embodiment thereof illustrated in Figure 1, the novel packing is illustrated as applied to a shaft or plunger 2 reciprocal within an opening 4 in a body 6 containing high pressure fluid as, for example, the body of a high pressure pump.

The packing comprises a plurality of non-metallic flexible rings 8 and a plurality of metallic rings 10 alternately arranged therewith, said rings being generally complementary in form and being approximately of V-shape in radial cross section, as seen in Figure 1. Fitted within each metallic ring 10 is an annulus 12 of non-metallic flexible material, said annulus being generally triangular in radial cross section with an apex of the triangle fitted within the abutting ring 10, and a base of the triangle bearing against the external surface of the abutting non-metallic ring 8 at approximately the apex thereof.

At one end of the stack of rings is positioned a ring or collar 14 having a surface 16 complemental to the abutting ring and at the opposite end of the stack is positioned a collar 18 having a surface 20 complemental to the abutting ring. The collar 18 is connected to an annular member 22 forming a packing gland therewith, the member 22 being adapted for connection to the body 6 as by bolts (not shown) to compress the stack of rings between the collars 14 and 18 thereby urging the radially inner perimeters of the rings against the plunger 2 and the radially outer perimeters of the rings against the margin of the opening 4 to afford a fluid tight seal within said opening around the plunger 2. If desired, the metallic ring 10 may be eliminated between the non-metallic rings 8 at the outer end of the stack which engages the collar 18, as may be noted at the right of Figure 1.

Another embodiment of the invention is illustrated in Figure 3 wherein the stack of packing rings is adapted to be compressed between collars 24 and 26. In this embodiment, the non-metallic flexible rings are designated 28, only two of such rings being shown although it will be understood that any desired number may be utilized. The metallic ring is designated at 30 and the non-metallic flexible annulus at 32. It will be noted that in this embodiment the annulus 32 is fitted within the abutting non-metallic ring 28 and bears against an external surface of the metallic ring 30 at the apex thereof. Thus the arrangement of Figure 3 is substantially identical with that of Figure 1 except for the fact that the annulus is disposed at the opposite side of the metallic ring.

The non-metallic rings in either embodiment may be formed of leather, rubber or any other suitable flexible, non-metallic material.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claim.

I claim:

A high pressure packing comprising at least one pair of spaced non-metallic flexible packing rings, said rings being approximately of V-shape in radial cross section, the legs of each V being approximately equal in length from its apex, a flexible metallic ring between said non-metallic rings, said metallic ring being approximately of V-shape in radial cross section and generally conforming to the shape of the non-metallic rings, one side of said metallic ring being snugly fitted against and bearing from its inner perimeter to its outer perimeter against one of said non-metallic rings from the inner perimeter to the outer perimeter thereof, and a non-metallic flexible annulus substantially triangular in radial cross section, said annulus being disposed between and abutting the metallic ring and the other non-metallic ring, with a base of the triangle bearing against the external surface of the metallic ring at the apex thereof and an apex of the triangle being complementary to and bearing against the other non-metallic ring at the internal apex thereof, said annulus bearing from its inner to its outer perimeter against said other non-metallic ring, and said other non-metallic ring bearing against said metallic ring from the inner and outer perimeters thereof to approximately the base of said triangle, the inner perimeters of said rings being formed as a substantially continuous cylindrical surface for engagement with a sealed member, and the outer perimeters of said rings being formed as another substantially continuous cylindrical surface for engagement with another sealed member.

RELZA J. HESS.

REFERENCES CITED

The following references are of record in the file of this patent:

UNITED STATES PATENTS

| Number | Name | Date |
|---|---|---|
| 917,690 | Weese | Apr. 6, 1909 |
| 2,264,147 | Dunlevy | Nov. 25, 1941 |

FOREIGN PATENTS

| Number | Country | Date |
|---|---|---|
| 130,937 | Great Britain | of 1919 |
| 559,600 | France | of 1923 |

OTHER REFERENCES

"Hydraulic and Pneumatic Leather Packing, Design and Application," by Chicago Belting Co., copyrighted 1939, page 24, copy in Division 52.